US 8,223,646 B2

(12) United States Patent
Cai et al.

(10) Patent No.: US 8,223,646 B2
(45) Date of Patent: Jul. 17, 2012

(54) TRANSPORT BLOCK SIZE SIGNALING FOR SEMI-PERSISTENT SCHEDULING

(75) Inventors: Zhijun Cai, Irving, TX (US); James E. Womack, Irving, TX (US); Yi Yu, Irving, TX (US); Richard Charles Burbidge, Slough (GB); Gordon Peter Young, Slough (GB); Takashi Suzuki, Tokyo (JP)

(73) Assignee: Research In Motion Limited, Waterloo, Ontario (CA)

( * ) Notice: Subject to any disclaimer, the term of this patent is extended or adjusted under 35 U.S.C. 154(b) by 461 days.

(21) Appl. No.: 12/562,600

(22) Filed: Sep. 18, 2009

(65) Prior Publication Data

US 2010/0075691 A1     Mar. 25, 2010

Related U.S. Application Data

(60) Provisional application No. 61/098,553, filed on Sep. 19, 2008.

(51) Int. Cl.
*H04J 1/16*     (2006.01)
(52) U.S. Cl. ................ 370/235; 370/395.4; 370/447
(58) Field of Classification Search ............... 370/235, 370/349, 395.4, 447, 252, 461, 462
See application file for complete search history.

(56) References Cited

U.S. PATENT DOCUMENTS

| | | | | |
|---|---|---|---|---|
| 8,031,656 | B2* | 10/2011 | Balachandran et al. | 370/328 |
| 2008/0310355 | A1* | 12/2008 | Cai et al. | 370/329 |
| 2009/0003282 | A1* | 1/2009 | Meylan et al. | 370/331 |

OTHER PUBLICATIONS

PCT International Search Report; PCT Application No. PCT/US2009/057447; Jan. 28, 2010; 3 pgs.
PCT Written Opinion of the International Searching Authority; PCT Application No. PCT/US2009/57447; Jan. 28, 2010; 5 pgs.
Wang, Haiming, et al.; Title: Performance Comparison of Controlless Scheduling Policies for VoIP in LTE UL; IEEE WCNC 2008; Mar. 31, 2008; pp. 2497-2501.
Wang, Haiming, et al.; Title: A Novel Bidirectional Resource Allocation to Decrease Signaling for Retransmission in LTE System; IEEE VTC 2008; May 11, 2008; pp. 2269-2271.
Meylan, Arnaud; Title: LS Response to Semi-Persistent Scheduling Activation with Single PDCCH; R2-084903; 3GPP TSG RAN WG2 Meeting #63; Jeju, Korea; Aug. 18-22, 2008; 2 pgs.
Vice Chairman; Title: Report of E-UTRA User Plane Session; R2-084861; 3GPP TSG-RAN WG2 Meeting #63; Jeju, Korea; Aug. 18-22, 2008; 26 pgs.
Motorola; Title: TBS and MCS Signaling and Tables; R1-081638; 3GPP TSG RAN1 #52bis; Shenzhen, China; Mar. 31-Apr. 4, 2008; 14 pgs.

(Continued)

*Primary Examiner* — Brenda H Pham
(74) *Attorney, Agent, or Firm* — Conley Rose, P.C.; J. Robert Brown, Jr.

(57)     ABSTRACT

A method is provided for improving reliability in semi-persistent scheduling activation/reactivation is provided. The method includes a user agent receiving a first data element from an access device specifying at least one first transport block size. The method further includes the user agent deriving a second transport block size based on a second data element received from the access device. The method further includes the user agent comparing the first transport block size with the second transport block size. The method further includes, when the first transport block size differs from the second transport block size, the user agent ignoring the received semi-persistent scheduling activation/reactivation data.

21 Claims, 4 Drawing Sheets

OTHER PUBLICATIONS

3GPP TS 36.300 v8.6.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2; Release 8; Sep. 2008; 137 pgs.

3GPP TS 36.321 v8.3.0; 3rd Generation Partnership Project; Technical Specification Group Radio Access Network; Evolved Universal Terrestrial Radio Access (E-UTRA) Medium Access Control (MAC) Protocol Specification; Release 8; Sep. 2008; 36 pgs.

3GPP TS 36.331 v8.3.0; 3rd Generation Partnership Project; Technical Specification Group Radio Access Network; Evolved Universal Terrestrial Radio Access (E-UTRA) Radio Resource Control (RRC); Protocol Specification; Release 8; Sep. 2008; 99 pgs. Part 1.

3GPP TS 36.331 v8.3.0; 3rd Generation Partnership Project; Technical Specification Group Radio Access Network; Evolved Universal Terrestrial Radio Access (E-UTRA) Radio Resource Control (RRC); Protocol Specification; Release 8; Sep. 2008; 79 pgs. Part 2.

* cited by examiner

Fig. 3
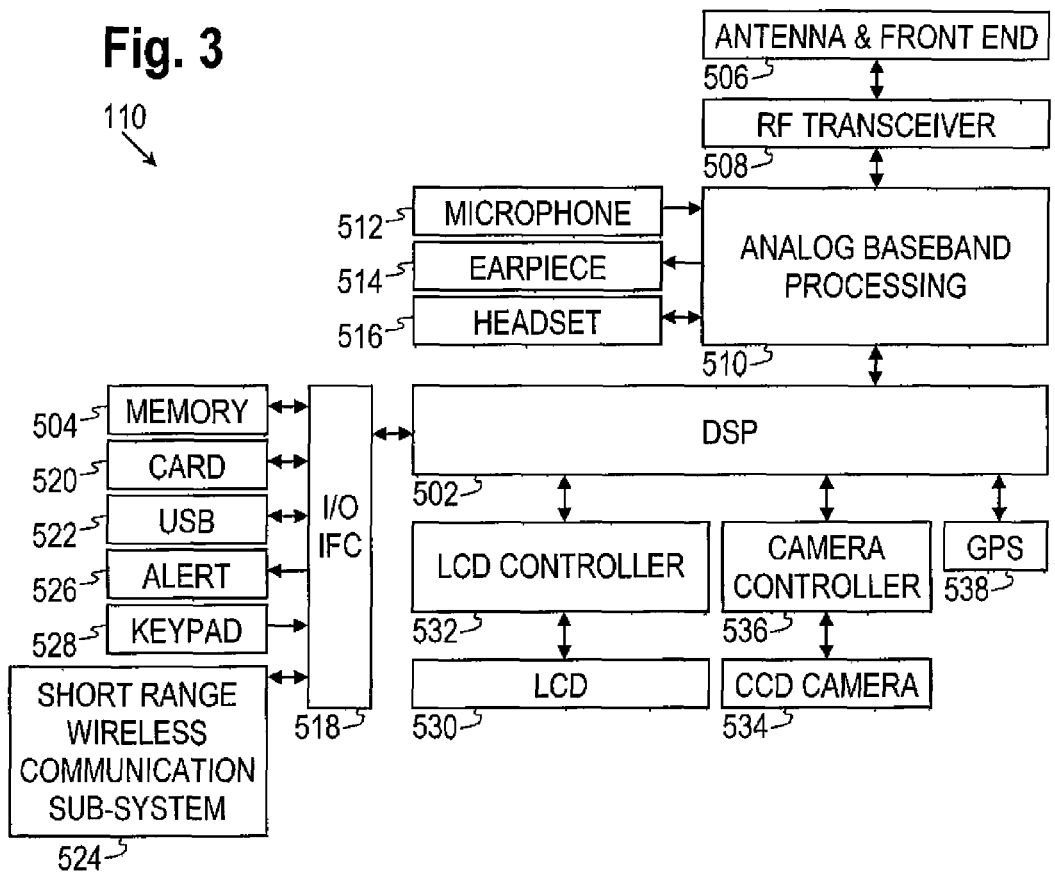
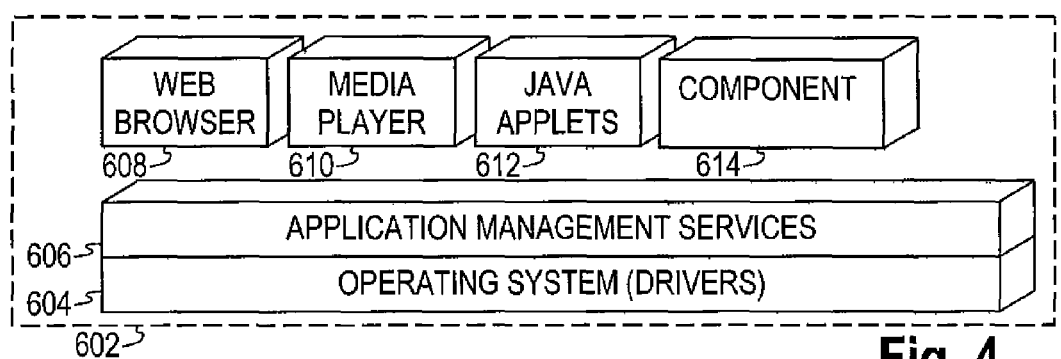
Fig. 4

TRANSPORT BLOCK SIZE SIGNALING FOR SEMI-PERSISTENT SCHEDULING

CROSS-REFERENCE TO RELATED APPLICATIONS

The present application claims priority to U.S. provisional patent application No. 61/098,553, filed Sep. 19, 2008, by Zhijun Cai et al, entitled "Transport Block Size Signaling for Semi-Persistent Scheduling", which is incorporated by reference herein as if reproduced in its entirety.

BACKGROUND

As used herein, the terms "user agent" and "UA" can refer to wireless devices such as mobile telephones, personal digital assistants, handheld or laptop computers, and similar devices that have telecommunications capabilities. Such a UA might consist of a wireless device and its associated Universal Integrated Circuit Card (UICC) that includes a Subscriber Identity Module (SIM) application, a Universal Subscriber Identity Module (USIM) application, or a Removable User Identity Module (R-UIM) application or might consist of the device itself without such a card. The term "UA" may also refer to devices that have similar wireless capabilities but that are not transportable, such as telephones, desktop computers, set-top boxes, or network nodes. When a UA is a network node, the network node could act on behalf of another function such as a wireless device and simulate or emulate the wireless device. For example, for some wireless devices, the IP (Internet Protocol) Multimedia Subsystem (IMS) Session Initiation Protocol (SIP) client that would typically reside on the device actually resides in the network and relays SIP message information to the device using optimized protocols. In other words, some functions that were traditionally carried out by a wireless device can be distributed in the form of a remote UA, where the remote UA represents the wireless device in the network. The term "UA" can also refer to any hardware or software component that can terminate a SIP session.

In traditional wireless telecommunications systems, transmission equipment in a base station transmits signals throughout a geographical region known as a cell. As technology has evolved, more advanced network access equipment has been introduced that can provide services that were not possible previously. This advanced network access equipment might include, for example, an enhanced node B (eNB) rather than a base station or other systems and devices that are more highly evolved than the equivalent equipment in a traditional wireless telecommunications system. Such advanced or next generation equipment may be referred to herein as long-term evolution (LTE) equipment, and a packet-based network that uses such equipment can be referred to as an evolved packet system (EPS). As used herein, the term "access device" will refer to any component, such as a traditional base station or an LTE eNB, that can provide a UA with access to other components in a telecommunications system.

For packet data, the signal that carries data between a UA and an access device can have a specific set of frequency, time, and coding parameters and other characteristics that might be specified by the access device. A connection between a UA and an access device that has a specific set of such characteristics can be referred to as a resource. An access device typically establishes a different resource for each UA with which it is communicating at any particular time.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 3 is a block diagram of a user agent operable for some of the various embodiments of the disclosure.

FIG. 4 is a diagram of a software environment that may be implemented on a user agent operable for some of the various embodiments of the disclosure.

DETAILED DESCRIPTION

Figure 1:
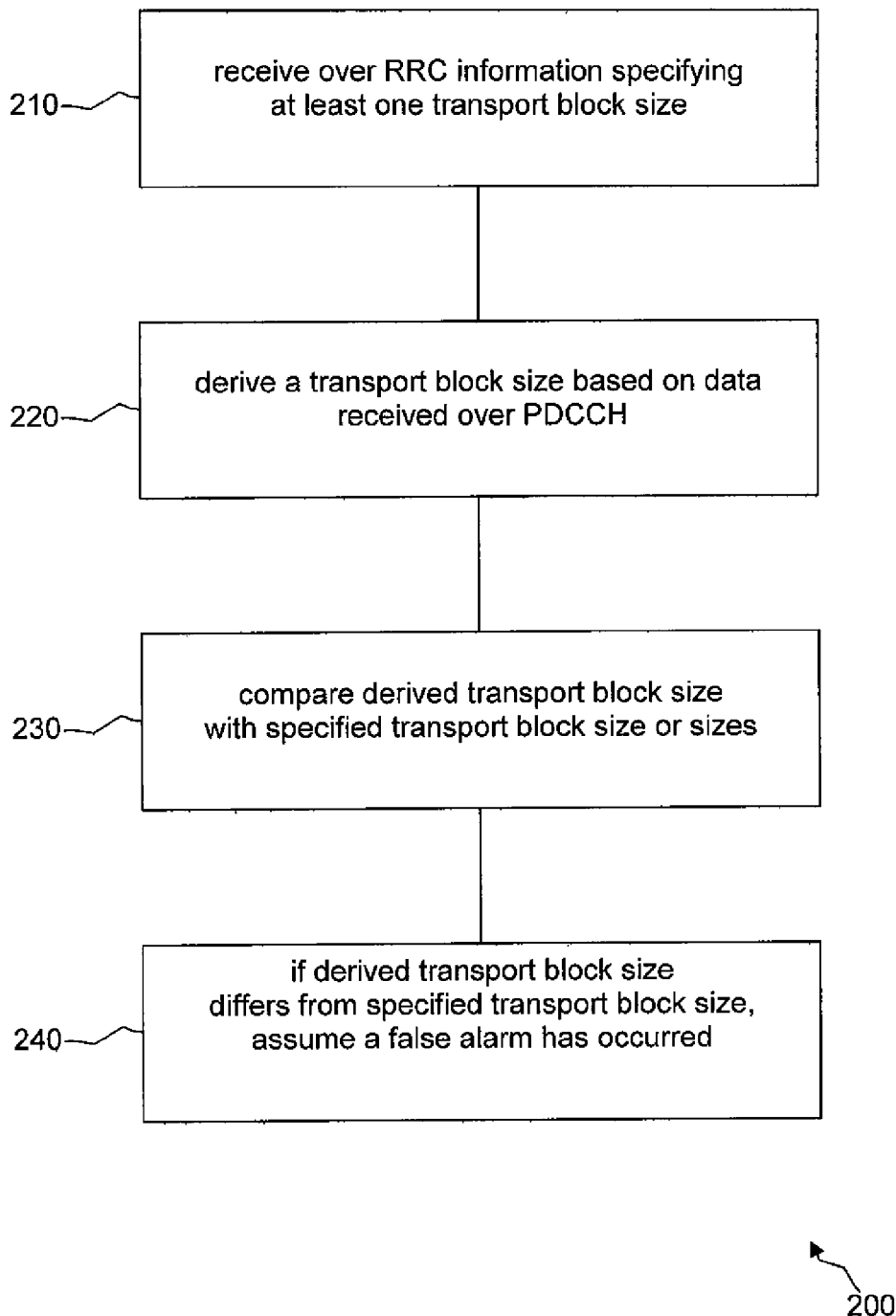
FIG. 1 is a diagram of a method for improving reliability in semi-persistent scheduling activation/reactivation according to an embodiment of the disclosure.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

According to one embodiment, a method for improving reliability in semi-persistent scheduling activation/reactivation is provided. The method includes a user agent receiving a first data element from an access device specifying at least one first transport block size. The method further includes the user agent deriving a second transport block size based on a second data element received from the access device. The method further includes the user agent comparing the first transport block size with the second transport block size. The method further includes, when the first transport block size differs from the second transport block size, the user agent ignoring the received semi-persistent scheduling activation/reactivation data.

In another embodiment, a user agent is provided. The user agent includes a processor configured to promote the user agent receiving a first data element from an access device specifying at least one first transport block size. The processor is further configured to promote the user agent deriving a second transport block size based on a second data element received from the access device. The processor is further configured to promote the user agent comparing the first transport block size with the second transport block size. The processor is further configured to promote the user agent, when the first transport block size differs from the second transport block size, ignoring the received semi-persistent scheduling activation/reactivation data.

In another embodiment, an access device is provided that includes a processor that is configured to promote transmission to a user agent of a first data element specifying at least one first transport block size. The processor is further configured to promote transmission of a second data element including information useable by the user agent to derive a second transport block size by comparing the first transport block size with the second transport block size, such that the user agent ignores the received semi-persistent scheduling activation/reactivation data when the first transport block size differs from the second transport block size.

During a voice session between a UA and an access device, talk spurts can alternate with silence periods. When a talk spurt ends and a silence period begins, the UA typically stops transmitting in the uplink resource that the UA had been using. The access device can then grant the resource to another UA. The releasing of the resource can be initiated by the UA or by the access device. When the silence period ends and a new talk spurt begins, the UA may request that the access device grant the UA a new uplink resource on which to resume transmitting data packets.

In a procedure known as semi-persistent scheduling (SPS) or configured scheduling, a resource for a data packet is granted and then substantially the same resource is periodically used for subsequent data packets. That is, in semi-persistent scheduling, the resource that an access device provides for data packets on an uplink or downlink is allocated at regular intervals based on a grant and/or a single scheduling request. An original grant of an SPS resource can be referred to as SPS activation. If, at a subsequent time, an access device needs to reallocate an SPS resource with different parameters, the subsequent grant can be referred to as SPS reconfiguration.

An access device typically grants an uplink or downlink resource to a UA by sending SPS activation/reconfiguration signaling to the UA over the physical downlink control channel (PDCCH). Among the data that the access device might include in the SPS activation/reconfiguration signaling are the size of the resource allocation and other parameters related to the resource allocation, such as the modulation and coding scheme that will be used for the resource. From this information, the UA can derive the size of the transport blocks that will be used to transmit data to the UA.

In some cases, a UA might mistakenly assume that an SPS activation/reconfiguration signal was addressed to itself, when the signal was actually intended for a different UA. The UA might then mistakenly assume that a resource has been allocated to it and might attempt to transmit data on a resource that was not actually allocated to it. Such detection or decoding error or other related mistaken assumption may be referred to herein as a false alarm or a false detection. False detections can waste the UA's computing capacity and battery power by causing the UA to attempt to transmit data on a resource that is not available to the UA or waste resources for retransmissions and so on.

In an embodiment, a UA can reduce the number of false detections by comparing its derived size of the transport blocks with one or more previously specified sizes for the transport blocks. More specifically, the transport block size as derived from information in the SPS activation/reconfiguration signaling over the PDCCH is compared with a size, a list of sizes, or a range of sizes for the transport blocks that the access device previously provided to the UA via control signaling, e.g., radio resource control (RRC) signaling. When the derived size does not match any of the specified sizes, the UA can assume that a false detection has occurred and that a resource that appears to have been allocated to the UA was actually intended for another UA. The UA might then ignore or discard the resource information received over the PDCCH or otherwise act as if the resource information had not been received.

In an embodiment, the access device can use at least one of three ways to inform the UA of the size, list of sizes, or range of sizes that will be used for the transport blocks. Each of the three techniques involves the access device sending transport block size information to the UA via control signaling, e.g., RRC signaling.

In the first technique, the access device transmits a list or an encoded list of one or more valid transport block sizes to the UA via RRC signaling, and the UA stores the list. At a later time, the access device transmits the SPS activation/reconfiguration signaling over the PDCCH to the UA, and the UA derives a transport block size from the information in the SPS activation/reconfiguration signaling. The UA then compares the derived transport block size with the transport block sizes on the stored list. If the derived transport block size does not match any of the transport block sizes on the stored list, the UA assumes that a false detection occurred and discards the resource information received over the PDCCH.

In the second technique, the access device transmits a range of valid transport block sizes to the UA via RRC signaling. That is, the access device might specify a minimum value and a maximum value for the size of the transport blocks. Alternatively, the access device might specify a minimum value and a second value that is to be added as an offset to the minimum value to represent the maximum value for the size of the transport blocks. The UA then stores this range of sizes. At a later time, the access device transmits the SPS activation/reconfiguration signaling over the PDCCH to the UA, and the UA derives a transport block size from the information in the SPS activation/reconfiguration signaling. The UA then determines whether the derived transport block size falls within the stored range of transport block sizes. If the derived transport block size does not fall within the specified range of transport block sizes, the UA assumes that a false detection occurred and discards the resource information received over the PDCCH.

In the third technique, one or more sets of transport block sizes are predefined and each set is assigned an index. Each set might correspond to a popular service, such as Voice over Internet Protocol (VoIP) transmissions or streaming video transmissions. As an example, the set of transport block sizes that will be used for VoIP might be predefined to be 100 bits, 200 bits, 300 bits, and 400 bits, and the set of transport block sizes that will be used for streaming video might be predefined to be 1000 bits, 2000 bits, 3000 bits, and 4000 bits. The set of VoIP transport block sizes might be assigned an index of "1", for example, and the set of streaming video transport block sizes might be assigned an index of "2", for example.

When the access device transmits data associated with a particular type of service, the access device can also transmit, via the RRC, the index associated with that type of service. Continuing the above example, if the access device is initiating a VoIP transmission to the UA, the access device might send the index "1" to the UA over the RRC. The UA would then know that the transport block sizes that will be used for the VoIP transmission will be either 100 bits, 200 bits, 300 bits, or 400 bits.

Upon receiving the SPS activation/reconfiguration signaling associated with the VoIP transmission, the UA can derive a transport block size as described above. If the derived transport block size does not match any of the transport block sizes corresponding to the index, the UA assumes that a false detection occurred and discards the resource information received over the PDCCH.

In one variation of the third technique, the indexes and the transport block sizes that are associated with the indexes are defined in a standard with which both the access device and the UA comply. Information about the standardized associations might be stored in both the access device and the UA prior to the access device sending an index to the UA. In this way, when the access device sends an index to the UA, the access device and the UA can both be aware of the set of transport block sizes that are associated with that index.

In another variation of the third technique, the access device defines which indexes are associated with which sets of transport block sizes. The access device then sends information about the defined associations to the UA prior to sending an index to the UA. In an embodiment, the access device transmits this information over the broadcast control channel (BCCH). The UA stores the defined associations and, upon receiving an index, is aware of the transport block sizes associated with the index.

FIG. 1 illustrates an embodiment of a method 200 for improving reliability in semi-persistent scheduling activation/reactivation. At block 210, a UA receives from an access device information specifying at least one transport block size. The information is sent via the RRC and might be a list of transport block sizes, a range of transport block sizes, or an index associated with a set of transport block sizes. At block 220, the UA derives a transport block size based on data received from the access device via the PDCCH. At block 230, the UA compares the derived transport block size with the specified transport block size or sizes. At block 240, if the derived transport block size differs from the specified transport block size or sizes, the UA assumes that a false detection has occurred.

Figure 2:
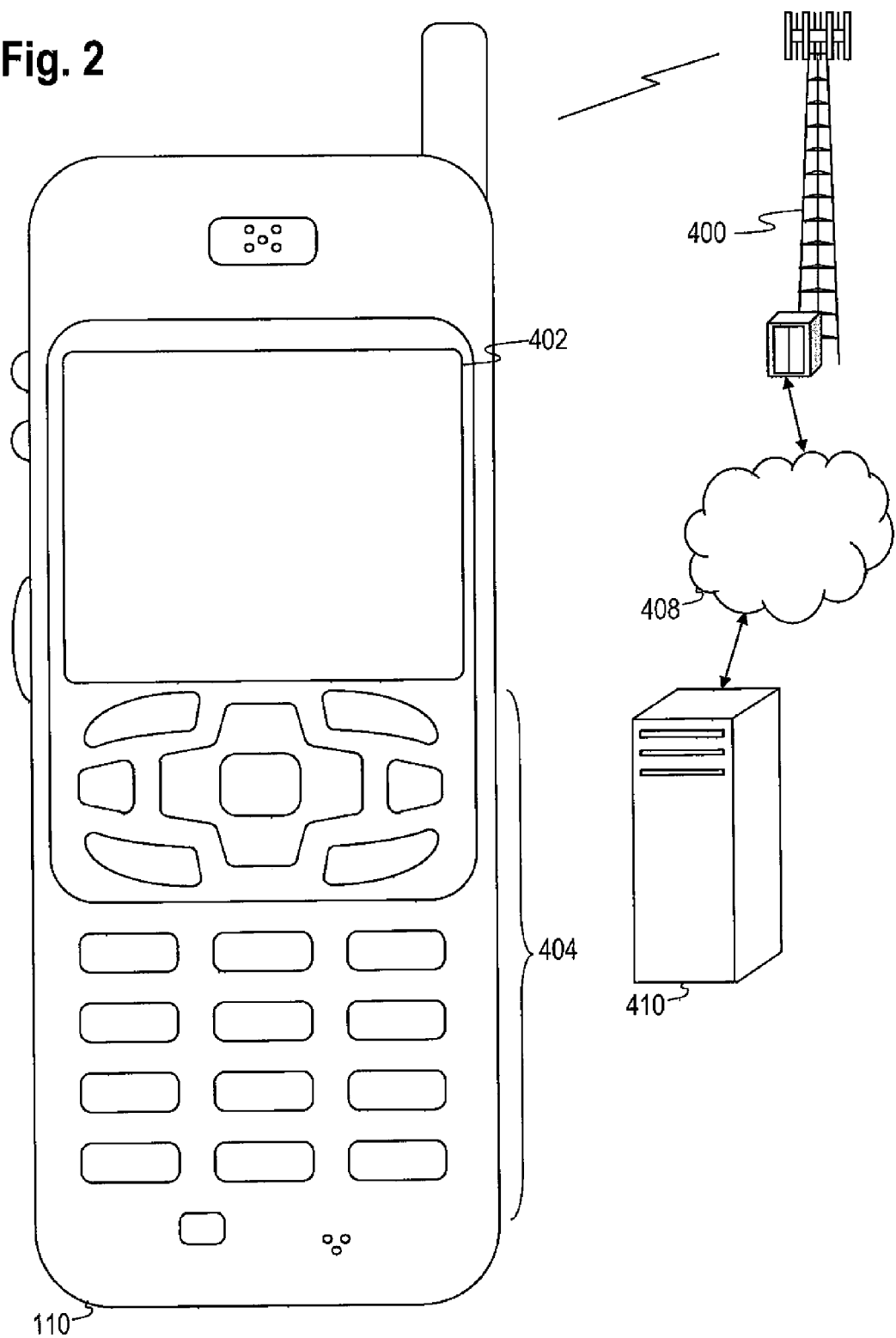
FIG. 2 is a diagram of a wireless communications system including a user agent operable for some of the various embodiments of the disclosure.

FIG. 2 illustrates a wireless communications system including an embodiment of a UA 110. The UA 110 is operable for implementing aspects of the disclosure, but the disclosure should not be limited to these implementations. Though illustrated as a mobile phone, the UA 110 may take various forms including a wireless handset, a pager, a personal digital assistant (PDA), a portable computer, a tablet computer, or a laptop computer. Many suitable devices combine some or all of these functions. In some embodiments of the disclosure, the UA 110 is not a general purpose computing device like a portable, laptop or tablet computer, but rather is a special-purpose communications device such as a mobile phone, a wireless handset, a pager, a PDA, or a telecommunications device installed in a vehicle. In another embodiment, the UA 110 may be a portable, laptop or other computing device. The UA 110 may also be a device, include a device, or be included in a device that has similar capabilities but that is not transportable, such as a fixed line telephone, a desktop computer, a set-top box, or a network node. The UA 110 may support specialized activities such as gaming, inventory control, job control, and/or task management functions, and so on.

The UA 110 includes a display 402. The UA 110 also includes a touch-sensitive surface, a keyboard or other input keys generally referred as 404 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The UA 110 may present options for the user to select, controls for the user to actuate, and/or cursors or other indicators for the user to direct.

The UA 110 may further accept data entry from the user, including numbers to dial or various parameter values for configuring the operation of the UA 110. The UA 110 may further execute one or more software or firmware applications in response to user commands. These applications may configure the UA 110 to perform various customized functions in response to user interaction. Additionally, the UA 110 may be programmed and/or configured over-the-air, for example from a wireless base station, a wireless access point, or a peer UA 110.

Among the various applications executable by the UA 110 are a web browser, which enables the display 402 to show a web page. The web page may be obtained via wireless communications with a wireless network access node, a cell tower, a peer UA 110, or any other wireless communication network or system 400. The network 400 is coupled to a wired network 408, such as the Internet. Via the wireless link and the wired network, the UA 110 has access to information on various servers, such as a server 410. The server 410 may provide content that may be shown on the display 402. Alternately, the UA 110 may access the network 400 through a peer UA 110 acting as an intermediary, in a relay type or hop type of connection.

FIG. 3 shows a block diagram of the UA 110. While a variety of known components of UAs 110 are depicted, in an embodiment a subset of the listed components and/or additional components not listed may be included in the UA 110. The UA 110 includes a digital signal processor (DSP) 502 and a memory 504. As shown, the UA 110 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, a short range wireless communication sub-system 524, an alert 526, a keypad 528, a liquid crystal display (LCD), which may include a touch sensitive surface 530, an LCD controller 532, a charge-coupled device (CCD) camera 534, a camera controller 536, and a global positioning system (GPS) sensor 538. In an embodiment, the UA 110 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the UA 110 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the UA 110 to send and receive information from a cellular network or some other available wireless communications network or from a peer UA 110. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF Transceiver 508, portions of the Antenna and Front End 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset 516 and outputs to the earpiece 514 and the headset 516. To that end, the analog baseband processing unit 510 may have ports for connecting to the built-in microphone 512 and the earpiece speaker 514 that enable the UA 110 to be used as a cell phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB interface 522 and the short range wireless communication sub-system 524. The USB interface 522 may be used to charge the UA 110 and may also enable the UA 110 to function as a peripheral device to exchange information with a personal computer or other computer system. The short range wireless communication sub-system 524 may include an infrared port, a Bluetooth interface, an IEEE 802.11 compliant wireless interface, or any other short range wireless communication sub-system, which may enable the UA 110 to communicate wirelessly with other nearby mobile devices and/or wireless base stations.

The input/output interface 518 may further connect the DSP 502 to the alert 526 that, when triggered, causes the UA 110 to provide a notice to the user, for example, by ringing, playing a melody, or vibrating. The alert 526 may serve as a mechanism for alerting the user to any of various events such as an incoming call, a new text message, and an appointment reminder by silently vibrating, or by playing a specific pre-assigned melody for a particular caller.

The keypad 528 couples to the DSP 502 via the interface 518 to provide one mechanism for the user to make selections, enter information, and otherwise provide input to the UA 110. The keyboard 528 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 530, which may include touch screen capability and also display text and/or graphics to the user. The LCD controller 532 couples the DSP 502 to the LCD 530.

The CCD camera 534, if equipped, enables the UA 110 to take digital pictures. The DSP 502 communicates with the CCD camera 534 via the camera controller 536. In another embodiment, a camera operating according to a technology other than Charge Coupled Device cameras may be employed. The GPS sensor 538 is coupled to the DSP 502 to decode global positioning system signals, thereby enabling the UA 110 to determine its position. Various other peripherals may also be included to provide additional functions, e.g., radio and television reception.

FIG. 4 illustrates a software environment 602 that may be implemented by the DSP 502. The DSP 502 executes operating system drivers 604 that provide a platform from which the rest of the software operates. The operating system drivers 604 provide drivers for the UA hardware with standardized interfaces that are accessible to application software. The operating system drivers 604 include application management services ("AMS") 606 that transfer control between applications running on the UA 110. Also shown in FIG. 4 are a web browser application 608, a media player application 610, and Java applets 612. The web browser application 608 configures the UA 110 to operate as a web browser, allowing a user to enter information into forms and select links to retrieve and view web pages. The media player application 610 configures the UA 110 to retrieve and play audio or audiovisual media. The Java applets 612 configure the UA 110 to provide games, utilities, and other functionality. A component 614 might provide functionality described herein.

Figure 5:
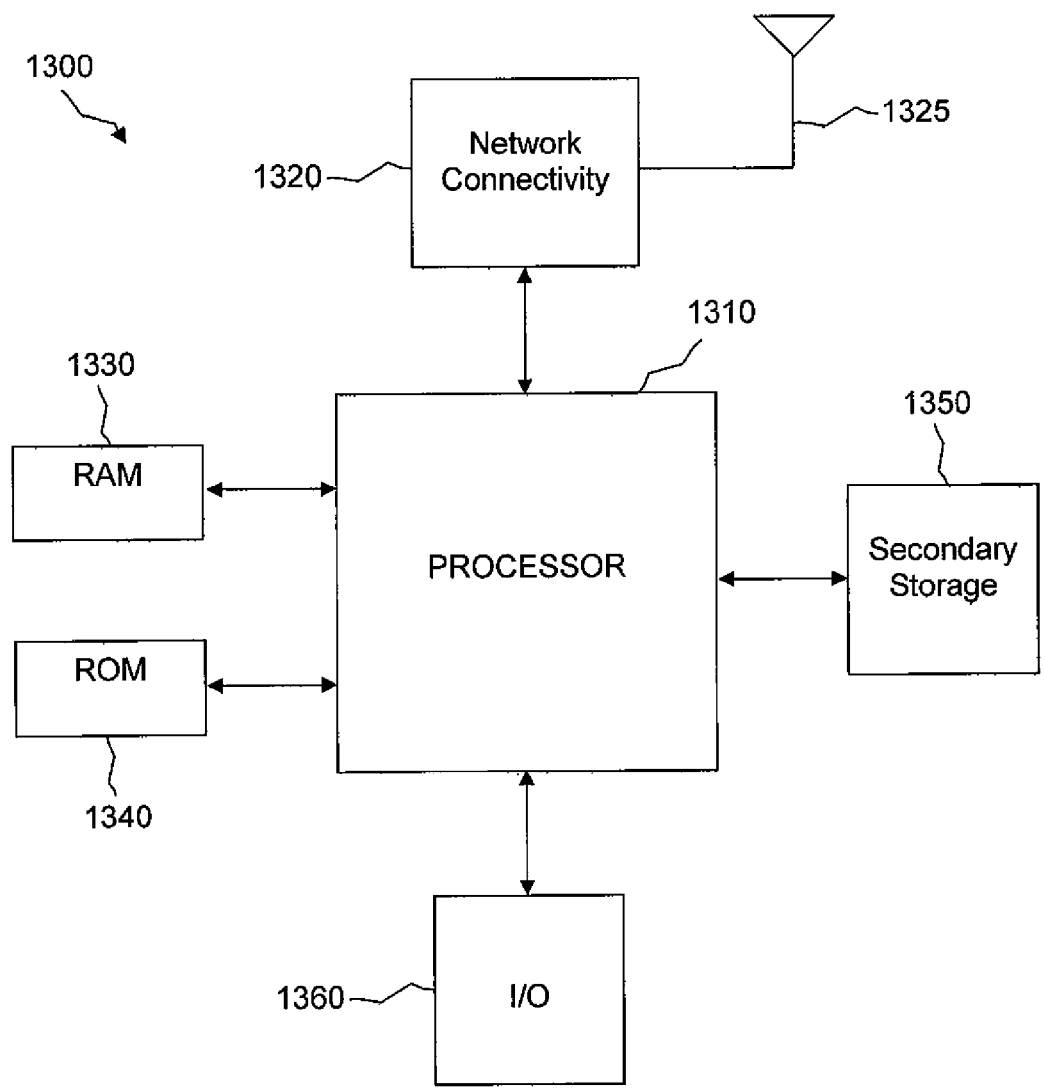
FIG. 5 is an illustrative general purpose computer system suitable for some of the various embodiments of the disclosure.

The UA 110 and other components described above might include a processing component that is capable of executing instructions related to the actions described above. FIG. 5 illustrates an example of a system 1300 that includes a processing component 1310 suitable for implementing one or more embodiments disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, or optical disk). While only one processor 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, universal mobile telecommunications system (UMTS) radio transceiver devices, worldwide interoperability for microwave access (WiMAX) devices, and/or other well-known devices for connecting to networks. These network connectivity devices 1320 may enable the processor 1310 to communicate with the Internet or one or more telecommunications networks or other networks from which the processor 1310 might receive information or to which the processor 1310 might output information.

The network connectivity devices 1320 might also include one or more transceiver components 1325 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1325 might include separate receiving and transmitting units or a single transceiver. Information transmitted or received by the transceiver 1325 may include data that has been processed by the processor 1310 or instructions that are to be executed by processor 1310. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs that are loaded into RAM 1330 when such programs are selected for execution.

The I/O devices 1360 may include liquid crystal displays (LCDs), touch screen displays, keyboards, keypads, switches, dials, mice, track balls, voice recognizers, card readers, paper tape readers, printers, video monitors, or other well-known input devices. Also, the transceiver 1325 might be considered to be a component of the I/O devices 1360 instead of or in addition to being a component of the network connectivity devices 1320. Some or all of the I/O devices 1360 may be substantially similar to various components depicted in the previously described drawing of the UA 110, such as the display 402 and the input 404.

The following 3rd Generation Partnership Project (3GPP) Technical Specifications (TS) are incorporated herein by reference: TS 36.321, TS 36.331, and TS 36.300.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for improving reliability in semi-persistent scheduling activation/reactivation, comprising:
    a user agent storing a first data element from an access device specifying at least one first transport block size;
    the user agent deriving a second transport block size based on a second data element received from the access device;
    the user agent comparing the first transport block size with the second transport block size; and
    when the first transport block size differs from the second transport block size, the user agent ignoring received semi-persistent scheduling activation/reactivation data.

2. The method of claim 1, wherein the first data element is transmitted from the access device to the user agent via radio resource control signaling.

3. The method of claim 1, wherein the second data element is transmitted from the access device to the user agent via a physical downlink control channel.

4. The method of claim 1, wherein the first data element is at least one of:
    a list of transport block sizes;
    a range of transport block sizes; and an index associated with a set of transport block sizes.

5. The method of claim 4, wherein, when the first data element is the index associated with the set of transport block sizes, the association between the index and the set of transport block sizes is predefined.

6. The method of claim 4, wherein, when the first data element is the index associated with the set of transport block sizes, the association between the index and the set of transport block sizes is defined by the access device and transmitted to the user agent by the access device.

7. The method of claim 6, wherein the access device transmits the association between the index and the set of transport block sizes over a broadcast control channel.

8. A user agent, comprising:
a processor configured to promote the user agent receiving a first data element from an access device specifying at least one first transport block size, deriving a second transport block size based on a second data element received from the access device, comparing the first transport block size with the second transport block size, and when the first transport block size differs from the second transport block size, ignoring received semi-persistent scheduling activation/reactivation data.

9. The user agent of claim 8, wherein the first data element is transmitted from the access device to the user agent via radio resource control signaling.

10. The user agent of claim 8, wherein the second data element is transmitted from the access device to the user agent via a physical downlink control channel.

11. The user agent of claim 8, wherein the first data element is at least one of:
a list of transport block sizes;
a range of transport block sizes; and
an index associated with a set of transport block sizes.

12. The user agent of claim 11, wherein, when the first data element is the index associated with the set of transport block sizes, the association between the index and the set of transport block sizes is predefined.

13. The user agent of claim 11, wherein, when the first data element is the index associated with the set of transport block sizes, the association between the index and the set of transport block sizes is defined by the access device and transmitted to the user agent by the access device.

14. The user agent of claim 13, wherein the access device transmits the association between the index and the set of transport block sizes over a broadcast control channel.

15. An access device, comprising:
a processor configured to promote transmission to a user agent of a first data element specifying at least one first transport block size, the processor further configured to promote transmission of a second data element including information useable by the user agent to derive a second transport block size by comparing the first transport block size with the second transport block size, and such that the user agent ignores received semi-persistent scheduling activation/reactivation data when the first transport block size differs from the second transport block size.

16. The access device of claim 15, wherein the first data element is transmitted via radio resource control signaling.

17. The access device claim 15, wherein the second data element is transmitted via a physical downlink control channel.

18. The access device of claim 15, wherein the first data element is at least one of:
a list of transport block sizes;
a range of transport block sizes; and
an index associated with a set of transport block sizes.

19. The access device of claim 18, wherein, when the first data element is the index associated with the set of transport block sizes, the association between the index and the set of transport block sizes is predefined.

20. The access device of claim 18, wherein, when the first data element is the index associated with the set of transport block sizes, the association between the index and the set of transport block sizes is defined by the access device and transmitted to the user agent by the access device.

21. The access device of claim 20, wherein the access device transmits the association between the index and the set of transport block sizes over a broadcast control channel.

* * * * *